US012763639B2

(12) United States Patent
Schweiggart et al.

(10) Patent No.: US 12,763,639 B2
(45) Date of Patent: Oct. 13, 2026

(54) COVERING FOR A COMPONENT OF AN ELECTRICAL DRIVE SYSTEM

(71) Applicant: Reinz-Dichtungs-GmbH, Neu-Ulm (DE)

(72) Inventors: Franz Schweiggart, Neu-Ulm (DE); Brian Heath, Neu-Ulm (DE); Luca Bumb, Neu-Ulm (DE); Lukas Hahn, Neu-Ulm (DE); Andreas Maier, Neu-Ulm (DE); Claudio Pedicillo, Neu-Ulm (DE); Andreas Kast, Neu-Ulm (DE)

(73) Assignee: REINZ-DICHTUNGS-GMBH, Neu-Ulm (DE)

( * ) Notice: Subject to any disclaimer, the term of this patent is extended or adjusted under 35 U.S.C. 154(b) by 435 days.

(21) Appl. No.: 18/360,606

(22) Filed: Jul. 27, 2023

(65) Prior Publication Data

US 2024/0039364 A1 Feb. 1, 2024

(30) Foreign Application Priority Data

Jul. 28, 2022 (DE) ..................... 20 2022 104 291.8

(51) Int. Cl.
*H02K 5/24* (2006.01)
*G10K 11/16* (2006.01)

(52) U.S. Cl.
CPC ............... *H02K 5/24* (2013.01); *G10K 11/16* (2013.01)

(58) Field of Classification Search
CPC ............................... H02K 5/24; G10K 11/168
USPC .......................................................... 181/202
See application file for complete search history.

(56) References Cited

U.S. PATENT DOCUMENTS 3,980,912 A * 9/1976 Panza ...................... H02K 5/24 181/202
4,150,313 A * 4/1979 Panza ..................... B61C 17/04 310/62
4,347,043 A * 8/1982 Morris ................ F04B 39/0033 417/313

(Continued)

FOREIGN PATENT DOCUMENTS

CN 108696046 A * 10/2018 ............... H02K 5/24
CN 110971065 A * 4/2020 ............. H02K 5/161
CN 210624737 U * 5/2020 ................ F24F 1/12

(Continued)

OTHER PUBLICATIONS

English translation of DE-102010039463-A1, accessed Oct. 1, 2025 via Espacenet, <https://translationportal.epo.org/emtp/translate/?ACTION=description-retrieval&COUNTRY=DE&ENGINE=google&FORMAT=docdb&KIND=A1&LOCALE=en_EP&NUMBER=102010039463&SRCLANG=de&TRGLANG=en> (Year: 2012).*

*Primary Examiner* — Jeremy A Luks
(74) *Attorney, Agent, or Firm* — McCoy Russell LLP

(57) ABSTRACT

The present disclosure relates to a covering, such as a casing, for a component of an electrical drive system. Components of this kind are, for example, the electric motor or the inverter of an electric motor. Both the inverter and the electric motor itself generate noise at high frequencies, for instance between 6 kHz and 12 kHz, due to the switch elements used in them. These noises should not escape to the exterior because they are disruptive in terms of both frequency and volume. The present disclosure shows a cover for absorbing these noises, that is cost-effective and can be arranged close to the electric motor and its components.

20 Claims, 7 Drawing Sheets

(56) References Cited

U.S. PATENT DOCUMENTS

| | | | | |
|---|---|---|---|---|
| 2004/0065501 | A1 * | 4/2004 | Tong | G10K 11/168 181/290 |
| 2011/0180348 | A1 | 7/2011 | Nonogi et al. | |

FOREIGN PATENT DOCUMENTS

| | | | | | |
|---|---|---|---|---|---|
| DE | 10143167 | A1 | | 3/2003 | |
| DE | 102010039263 | A1 | | 2/2012 | |
| DE | 102010039463 | A1 | * | 2/2012 | G10K 11/162 |
| DE | 202012101648 | U1 | | 8/2013 | |
| DE | 102013208455 | A1 | | 11/2014 | |
| DE | 102020204281 | A1 | | 10/2021 | |
| EP | 0261295 | A1 | * | 3/1988 | H02K 9/06 |
| KR | 100862205 | B1 | * | 11/2008 | H02K 5/225 |

* cited by examiner

COVERING FOR A COMPONENT OF AN ELECTRICAL DRIVE SYSTEM

CROSS-REFERENCE TO RELATED APPLICATION

The present application claims priority to German Utility Model Application No. 20 2022 104 291.8, entitled "COVERING FOR A COMPONENT OF AN ELECTRICAL DRIVE SYSTEM" and filed Jul. 28, 2022. The entire contents of the above-listed application is hereby incorporated by reference for all purposes.

TECHNICAL FIELD

The present disclosure relates to a covering, such as a casing, for a component of an electrical drive system. Components of this kind are, for example, the electric motor or the inverter of an electric motor. Both the inverter and the electric motor itself generate noise at high frequencies, for instance between 6 kHz and 12 kHz, due to the switch elements used in them. These noises escape to the exterior and are disruptive in terms of both frequency and volume. Usually, these noises are kept away from the passenger compartment by equipping the engine compartment with noise-reducing insulation or by designing the passenger compartment so that it is sufficiently shielded from external noises. Both measures require a large amount of noise-reduction effort and are very costly.

BACKGROUND AND SUMMARY

The aim therefore has to be to reduce the costs of the insulation measures. Against this background, the object of the present disclosure is to provide cost-effective measures for reducing noises from an electric motor or its components.

This object is achieved by the covering according to the disclosure herein.

According to the present disclosure, the covering has a first layer that can enclose or does enclose the component at least in some portions. According to the present disclosure, a sound absorption layer is arranged on the inside of the first layer, which faces the component when in the installed state, and extends over the internal surface on the inside of the first layer in some regions, substantially or entirely. By means of a sound absorption layer of this kind, the sound emanating from the component can be absorbed directly at the source of the noise, and so the propagation of this noise into the surroundings can be reduced or prevented. For instance, not only are the driver and passengers of a vehicle equipped with the electric motor as the drive shielded from the noise, but so too are passers-by.

The solution according to the present disclosure for preventing the propagation of noises from an electric motor or inverter may allow large sound absorbers in the engine compartment of a vehicle to be omitted since the sound is already reduced directly at the source. This significantly lowers the work and costs required for minimising the noise.

The sound absorption layer according to the present disclosure need not necessarily be formed in a manner connected in one piece, but rather it can also have a plurality of separate regions. These regions can either directly adjoin one another or be arranged so as to be spaced apart from one another. For example, the sound absorption layer is arranged directly on the first layer, which may be formed as a metal layer. Alternatively, the sound absorption layer can also be arranged so as to be spaced apart from the first layer, e.g. by means of spacers. A distance of between 2 and 15 mm, or 4 mm, has proven favourable. When the sound absorption layer is arranged on the first layer so as to be spaced apart therefrom, it may be possible for the sound also to reach behind the sound absorption layer into the gap between the sound absorption layer and the first layer and for the sound also to be absorbed on the sound absorption layer surface that is arranged therein facing the first layer.

Thicknesses of between 2 mm and 30 mm, for example from 3 mm to 15 mm, and/or from 3 mm to 12 mm, are suitable thicknesses of the sound absorption layer. A thickness of 5 mm may be favorable in terms of the sound absorption properties and the associated costs.

The sound absorption layer can have a multiplicity of plies, such as a first ply made of a porous material having a thickness of between 2 mm and 30 mm and may be of a density of between 10 kg and 300 kg per m 3.

In addition, the sound absorption layer can have a second ply that contains or consists of a microperforated material. Said microperforated material can have a thickness of between 0.1 mm and 3 mm, such as from 0.15 mm to 4 mm, and/or of 0.2 mm. The openings/holes in the microperforated material may have a diameter of 0.1 mm to 2 mm. In the process, 5 to 20 holes per $cm^2$ are particularly advantageous. The values stated above are values at which good sound absorption occurs in the respective frequency range of the sound emitted by the electric motor or the inverter, such as between 6 kHz and 12 kHz.

The microperforated material can, for example, consist of or comprise a steel, such as a stainless steel, for example a 1.4301 steel. In this case for instance, the microperforated material can thus be a tanged sheet or a perforated sheet.

On one side or on both sides of the sound absorption layer, a further third ply can also be provided, which contains or consists of a woven fabric, for example a fine-meshed woven fabric. In this respect, a woven fabric made of stainless steel is expedient as a woven fabric of this kind. The mesh size of a woven fabric of this kind may be 0.1 to 2 mm. Such a woven fabric firstly prevents the fibres of the first ply from slipping through the holes in the second ply. Secondly, the woven fabric provides a further contribution to sound absorption.

It is also possible to have a further fourth ply, which can be arranged on one side of the first ply, which may consists of a metal material, for example stainless-steel sheet or, for instance in this case, 1.4301 steel or an aluminum sheet. This fourth ply may be located on the opposite side of the first ply to the microperforated layer.

Hereinafter, a number of examples of coverings, such as casings, according to the present disclosure and drive components according to the present disclosure will be set out. In this context, identical and similar elements are provided with identical and similar reference numerals without the description thereof being repeated. In the examples below, a multiplicity of optional features are combined to form the essential features according to the present disclosure. These optional features can also be used individually or in any combination with other optional features of the same example or a different example, in order to further develop the present disclosure.

DETAILED DESCRIPTION

Figure 1:
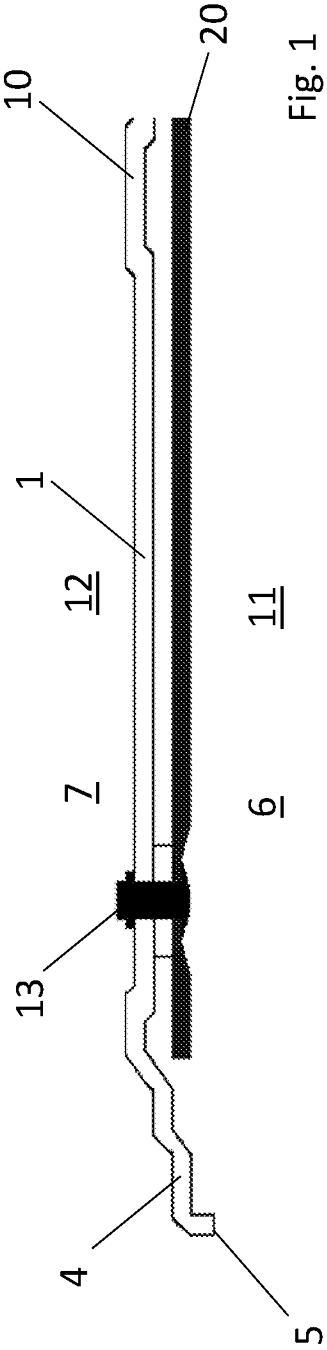
FIGS. 1 and 2 are cross sections through a detail of coverings according to the present disclosure.

FIG. 1 is a cross section through a detail of a covering 1 that forms a casing for an inverter or an electric motor. The covering 1 has an inside 6, which faces the component, e.g. the electric motor or the inverter, when in the fitted state, as well as an outside 7 facing away therefrom. In addition, the covering 1 has a first layer 10 as a casing element. This casing element is typically made of a metal material or a plastics material. A sound absorption layer 20 is arranged on the inside 6 of said first layer 1; it absorbs noises that emanate from the component to which the sound absorption layer is adjacent and thus reduces or prevents the transmission of said sound to the outside 7 of the covering 1. In FIG. 1, the cover 1 is, for example, a part of a lid 4 of a casing, said lid having a contact surface 5 with a casing trough (not shown).

The inside 11 of the sound absorption layer 20 can be found on the inside 6 of the first layer 10, and the outside 7 of the first layer 10 can be found on the outside 12 of the sound absorption layer 20.

In FIG. 1, the sound absorption layer 20 is arranged so as to be spaced apart from the first layer 1 by means of a spacer 13. This allows the sound generated by the component to be absorbed by the sound-absorbing layer 12 not only on the side 11. Rather, sound can also penetrate into the space between the first layer 10 and the sound-absorbing layer 20, where it is also absorbed by the sound-absorbing layer 20.

By way of example, the layer 10 can consist of sheet steel, stainless-steel sheet, aluminium, sandwich sheet, or be diecast. Dimensions may be a thickness of 0.1 to 6 mm, or 0.3 to 0.6 mm. The layer 10 can be smooth or structured, for example provided with knobs. In the present case, the layer 10 has a thickness of 0.4 mm.

Possible materials for the layer 20 are fibre mats such as fibreglass mats, basalt rock wool, cotton and natural fibres, or also foams such as PU foam or melamine foam. The thickness of the layer 20 can vary between 2 and 30 mm; for example a material having a thickness of 3-6 mm is used. In the present case, the layer 20 is a fibreglass mat having a thickness of 4 mm.

Figure 2:
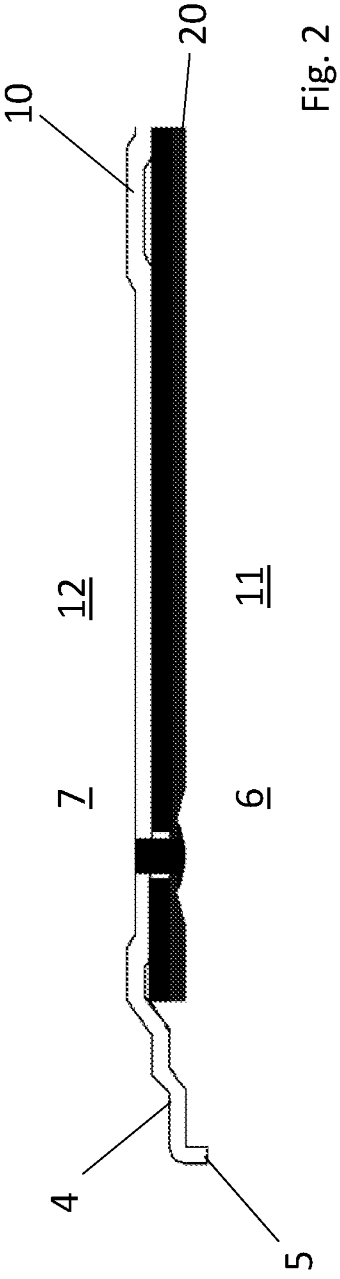

FIG. 2 shows a similar covering 1 to that in FIG. 1. Unlike FIG. 1, however, the sound absorption layer 20 is now arranged directly on the first layer 10 and is fastened to the first layer 10 by fastening elements 14 (a screw in this example).

Figure 3:
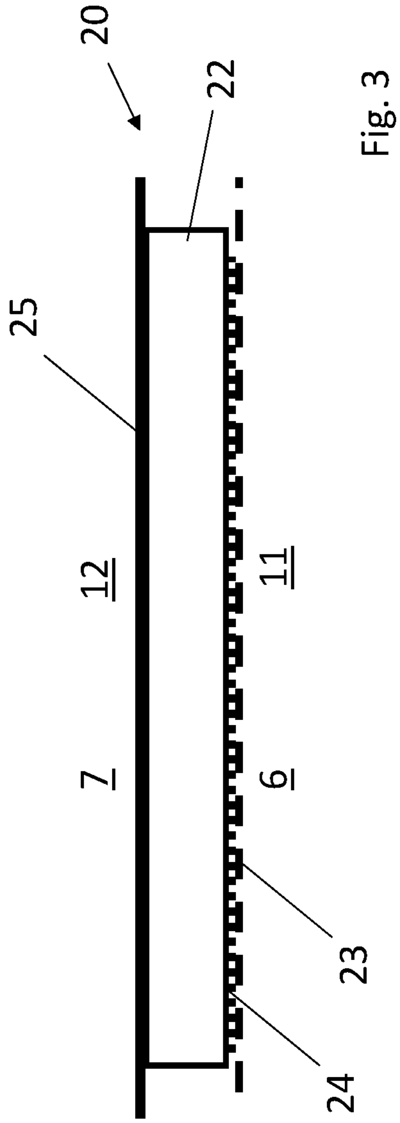
FIG. 3 is a cross section through a detail of a covering according to the present disclosure.

FIG. 3 is a cross section through a detail of a sound absorption layer 20 of a covering 1 according to the present disclosure that can be arranged thus on a first layer in FIG. 1 and FIG. 2 instead of the sound absorption layer 20 shown in those figures.

The sound absorption layer 20 has a first ply 22 made of a porous material. A second ply 23 of microperforated material, for example a stainless-steel tanged sheet, is arranged in the direction of the surrounded component, e.g. facing away from the first layer (not shown in FIG. 3), that is, on the inside 6 and 11. A third ply 24 of a woven fabric is arranged between the first ply 22 and the second ply 23. A fourth ply 25 is arranged on the side of the first ply 22 facing away from said plies, said fourth ply consisting of or containing a metal sheet, which in this example is continuous and not broken up by openings.

Since the sound absorption layer consists of a total of four plies made of porous material, microperforated material, woven fabric and a sheet metal, it has very good sound absorption properties.

The ply 22 of porous material can consist of a fleece-like material such as fibreglass mats, basalt rock wool, cotton or natural fibres, or also foams such as PU foam or melamine foam; in the present example it is a PU foam.

A tanged or perforated sheet made of stainless steel, steel or aluminium and having a thickness between 0.1 and 4 mm and a hole size of 0.1 to 4 mm, 0.3 to 2 mm, and/or 0.75 to 1.25 mm, may be used as the microperforated ply 23; in the present case it is a stainless-steel tanged sheet having a thickness of 2 mm and a hole size of 1 mm.

The woven fabric 24 can be a stainless-steel woven fabric, a glass woven fabric or a carbon woven fabric. By way of example, the stainless-steel woven fabric has a flow resistance of 1,430 Pas/m$^2$ in the present example. Where a Thermo-E glass woven fabric is used, it has a warp/weft thread count of 12/11.5 threads per cm, for example.

For instance, the fourth ply 25 consists of a further microperforated metal sheet made of aluminium, stainless steel or, as in the present example, steel having a hole size of 1 mm, especially if the construction of the covering corresponds to that in FIG. 1. The best-possible sound absorption is achieved using spacers and two microperforated plies. Alternatively, the ply 25 can also consist of a smooth sheet, for example of an aluminium foil having a thickness of 0.1 to 3 mm, or 0.5 mm. In a different configuration, the ply 25 can also consist of a stainless-steel sheet or steel sheet.

Figure 4:
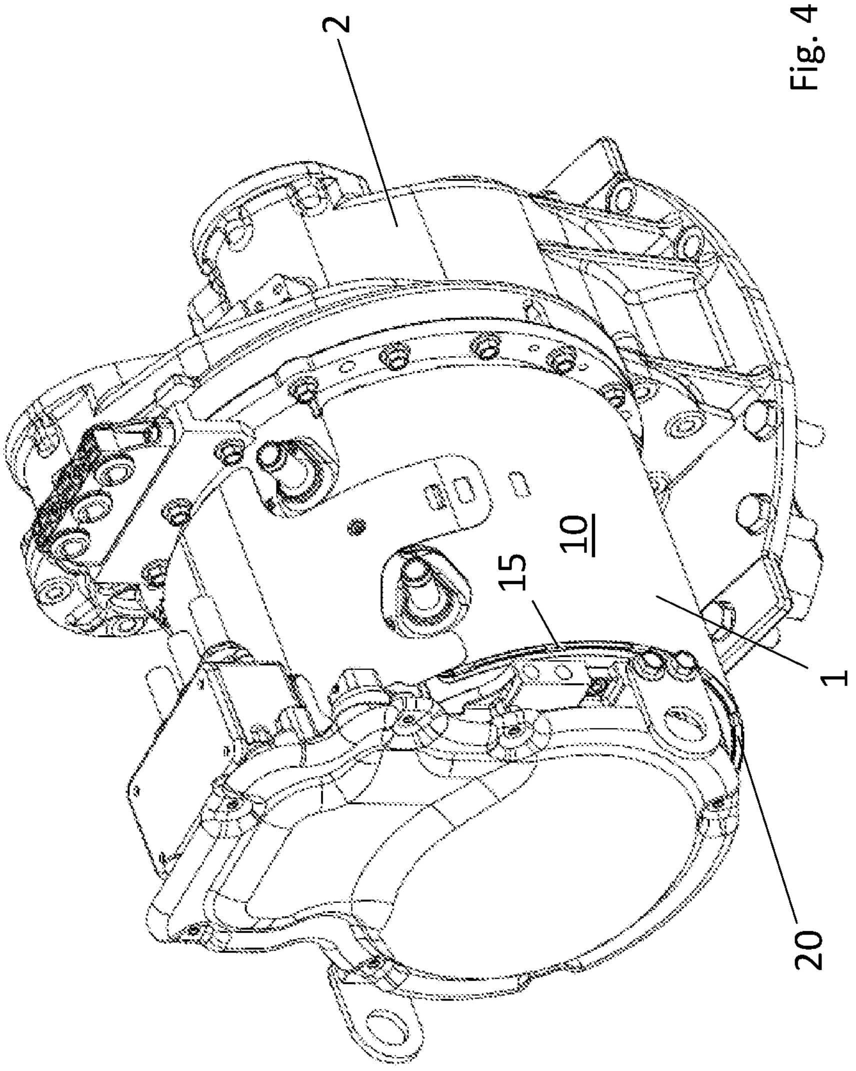
FIG. 4 shows an electric motor comprising a covering.

FIG. 4 shows an electric motor 2 installed in a casing 1 in the form of a covering. This casing surrounds the electric motor 2 in a cylindrical manner and has a first layer 10 on which a sound absorption layer 20 is arranged on the inside of the first layer 10 facing the electric motor 2. In FIG. 4, the sound absorption layer 20 is held on the first layer 10 by clamps 15.

In this case, the sound absorption layer 20 consists of a fibreglass mat and a microperforated sheet and is arranged so as to be spaced apart from the electric motor 2 by means of spacers 13. Unlike the spacer in FIG. 1, this spacer in FIG. 4 (not visible) and FIGS. 5A-C consists of microcellular rubber strips glued to the sound absorption layer 20. The microcellular rubber strips also prevent sound from escaping to the exterior since the interstice between the sound absorption layer 20 and the electric motor 2 can be closed in its entirety. Another effect of the spacer 13 in FIGS. 4 and 5 is that it compensates for geometric tolerances in the component and casing, due to its resilience.

Figure 5A:
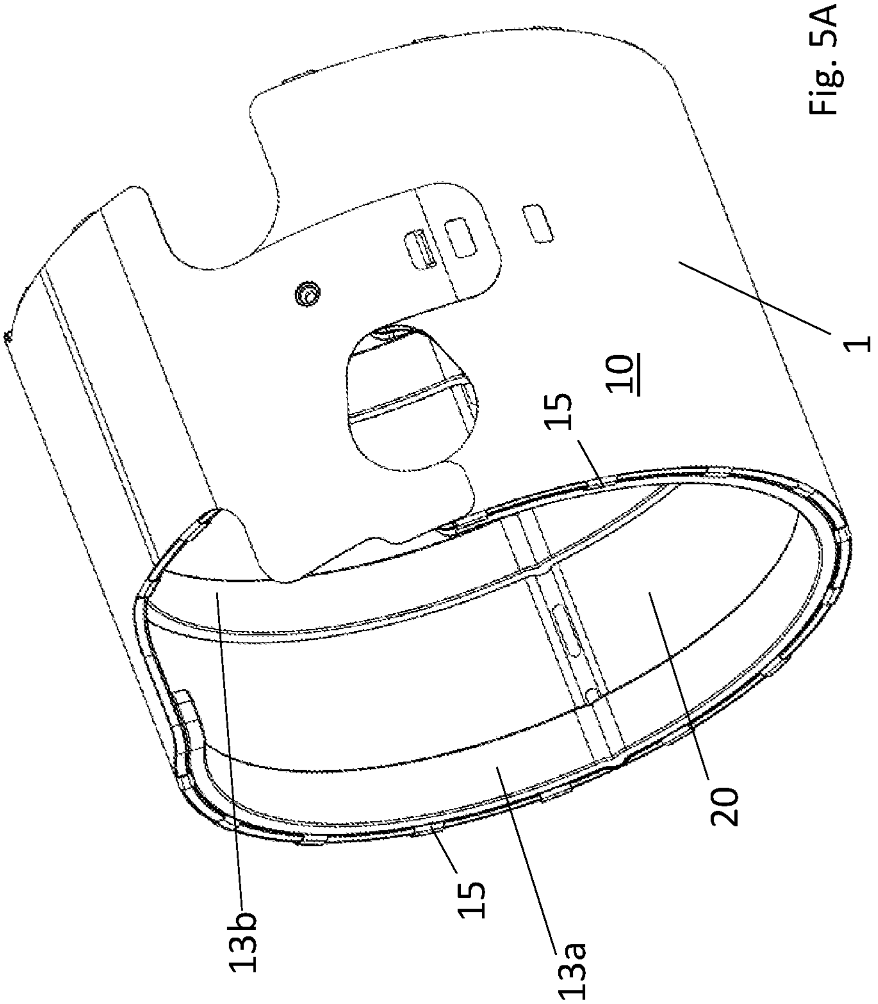
FIG. 5A shows the covering of the electric motor from FIG. 4.

FIG. 5A is a top view of the covering or casing 1 from FIG. 4 in isolated form. In this figure, the spacers 13 are clearly visible.

Figure 5B:
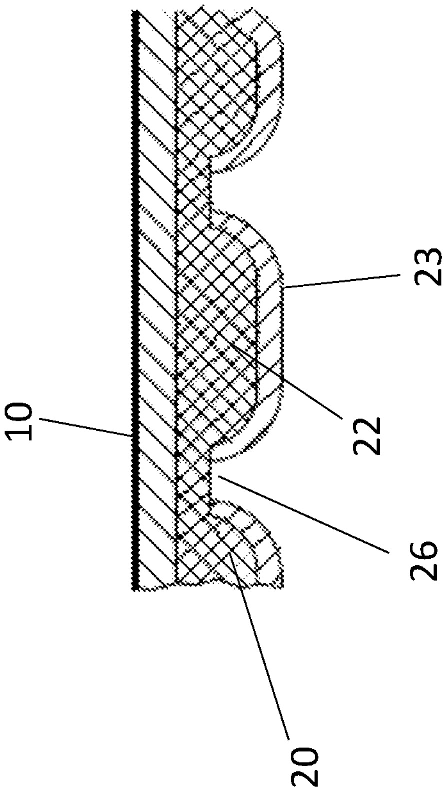
FIG. 5B shows an example configuration of the sound absorption layer from FIG. 5A.

FIG. 5B is a section through a possible configuration of the sound absorption layer 20 in FIG. 5A. In FIG. 5A and FIG. 5B, the first ply of the absorption layer 20, e.g. the porous ply 22, is formed from a fibreglass mat that is secured to the first layer together with the second ply of the absorption layer 20, e.g. with the microperforated ply 23, by clamps 15 which are formed integrally with the first layer 10. The second ply of the absorption layer, as shown in FIG. 5B, is a microperforated stainless-steel tanged sheet having holes 26.

Figure 5C:
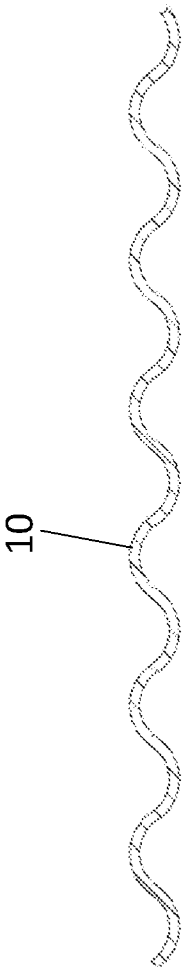
FIG. 5C shows an example configuration of the first layer 10 from FIG. 5A.

FIG. 5C is a cross section through a possible configuration of the layer 10 from FIGS. 5A-C in a highly enlarged view, having a knobbly structure. In this case, a knobbly sheet having a knob grid pattern of 5-20 mm, optionally 7 mm, and a knob height of 2.5 mm, for example, can be used, for example.

Figure 6:
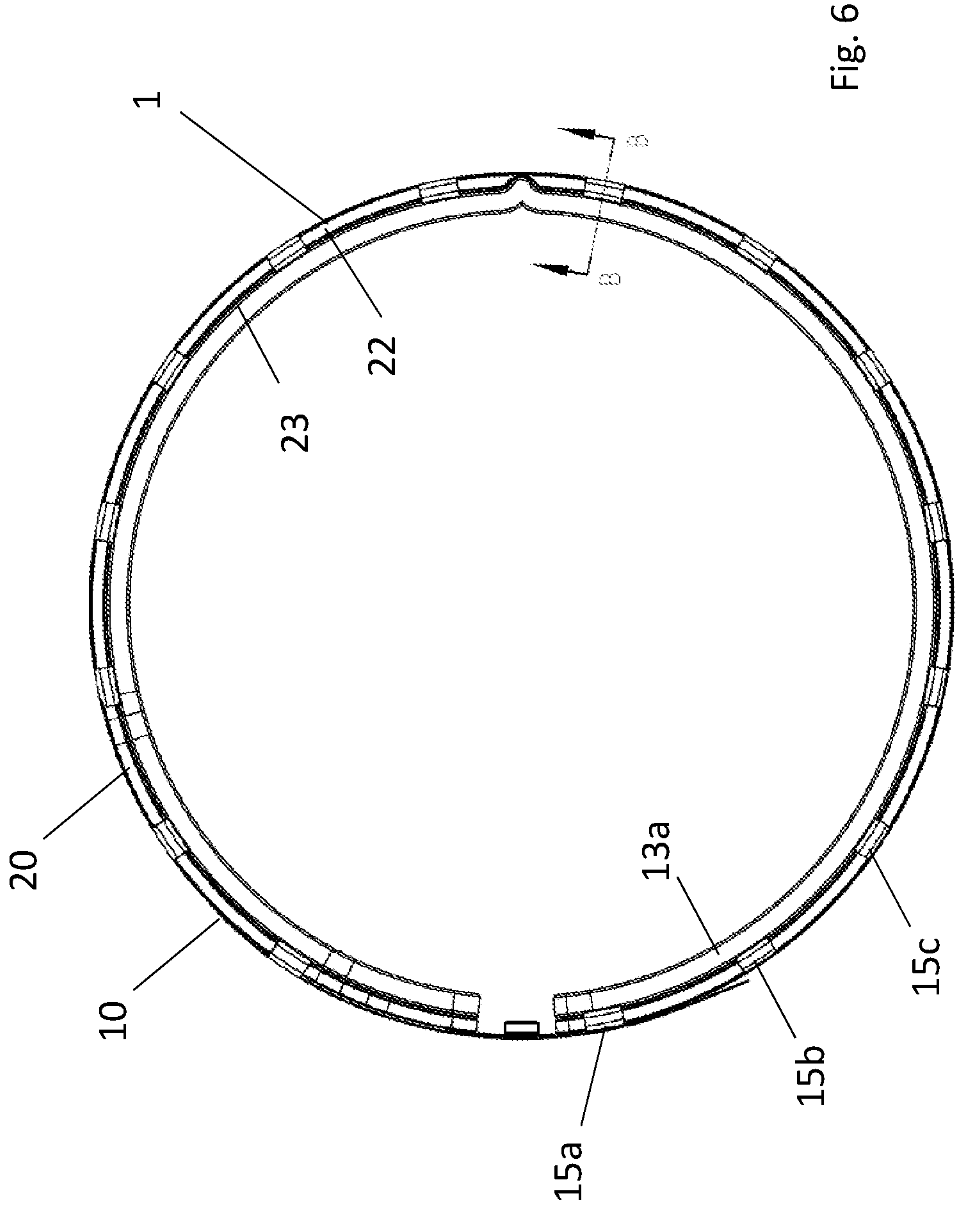
FIGS. 6 and 7 are sections through the covering of the electric motor from FIG. 4.

FIG. 6 is a plan view of the covering 1 from FIGS. 4 and 5A-C. From above it is possible to see the clamps 15 (a to c shown here), which are formed integrally out of the first layer and secure the absorption layer 20 from FIG. 5B, consisting of a porous ply 22 and a microperforated metal 23, on the first layer 10. Of the microcellular rubber spacers 13, only the uppermost (13*a*) can be seen.

Figure 7:
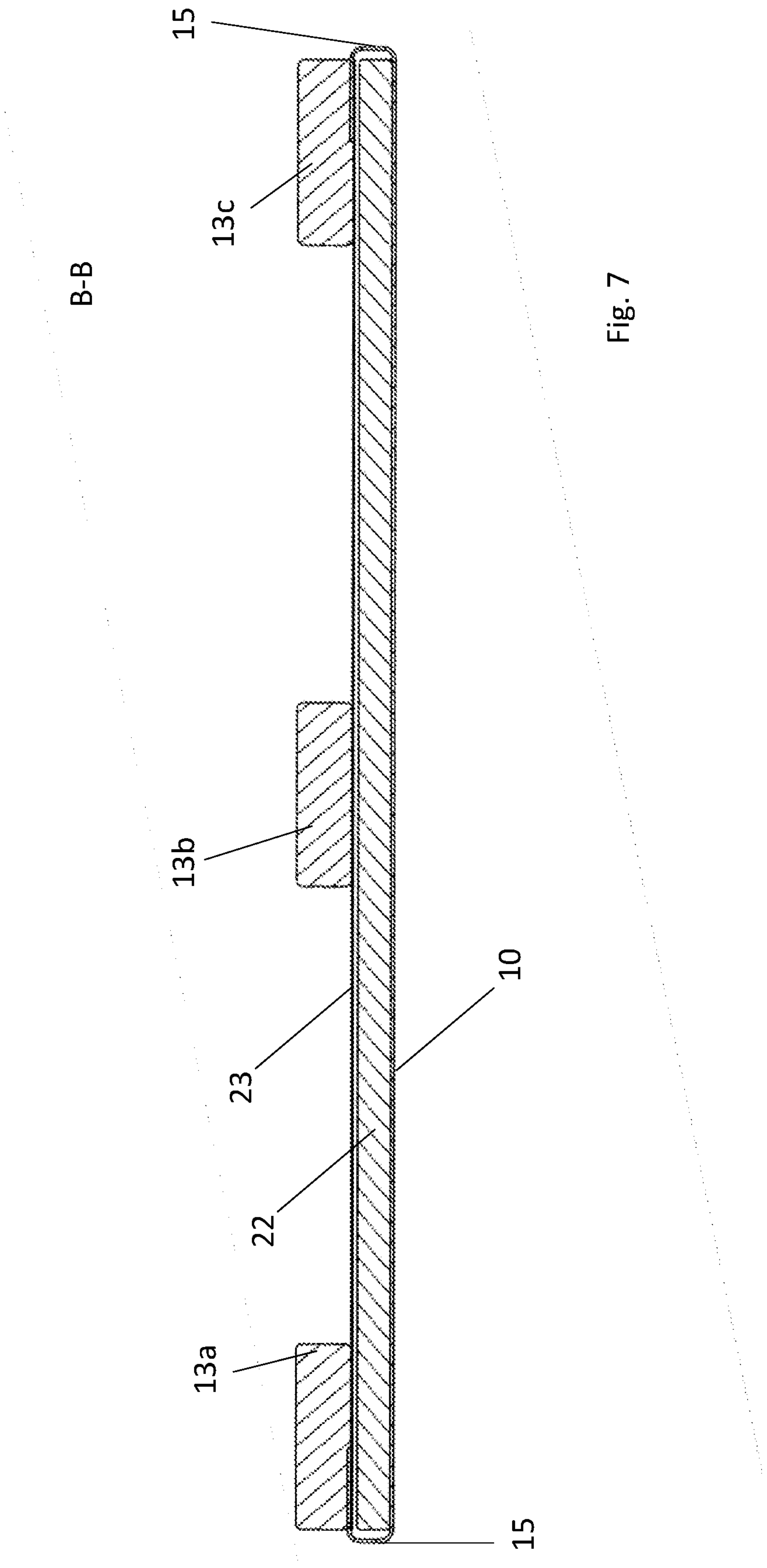

FIG. 7 shows a section along the line B-B in FIG. 6. All the spacers 13 *a* to *c* can now be seen, along with the first layer 10 and the sound absorption layer 20 having the porous ply 22 and the second ply of microperforated sheet metal 23. The clamps 15, which protrude integrally from the first layer 10 and secure the sound absorption layer to the first layer 10, can be seen at the right-hand and left-hand ends of the first layer 10. FIGS. 1, 2, and 4-7 are drawn to scale, although other relative dimensions and/or positioning may be used if desired.

The invention claimed is:

1. A covering for a component of an electrical drive system, comprising a first layer that can enclose or does enclose the component at least in some portions,
  - wherein a sound absorption layer is arranged on the inside of the first layer, which inside faces the component, and extends over the internal surface of the first layer in some regions, substantially or entirely,
  - wherein the sound absorption layer has or consists of a first ply made of a porous material, and wherein the porous material comprises a fleece-like material,
  - wherein the sound absorption layer has a second ply that contains or consists of a microperforated material, and
  - wherein the microperforated material comprises a tanged or perforated sheet made of stainless steel, steel or aluminum,
  - wherein the sound absorption layer has a third ply that contains or consists of a woven fabric, and
  - wherein the sound absorption layer has a fourth metal ply, and wherein the fourth metal ply comprises one of a stainless-steel sheet, an aluminum sheet, or steel having a hole size of 1 mm.

2. The covering according to claim 1, wherein the sound absorption layer is formed in a manner connected in one piece or has a plurality of separate regions.

3. The covering according to claim 2, wherein the sound absorption layer has a plurality of separate regions, and the plurality of separate regions directly adjoin one another directly without a gap therebetween or at least two of the plurality of separate regions are spaced apart from one another at least in some portions.

4. The covering according to claim 1, wherein the sound absorption layer is arranged directly on the first layer or so as to be spaced apart from the first layer.

5. The covering according to claim 4, wherein the sound absorption layer is arranged so as to be spaced apart from the first layer at a distance A of 2 mm≤A≤15 mm.

6. The covering according to claim 1, wherein the sound absorption layer has a thickness DS of 2 mm≤DS≤30 mm.

7. The covering according to claim 1, wherein the fleece-like material comprises a fiberglass mat.

8. The covering according to claim 1, wherein the first ply has a thickness DP of 2 mm≤DP≤30 mm.

9. The covering according to claim 1, wherein the first ply has a density from 10 $kg/m^3$ to 300 $kg/m^3$.

10. The covering according to claim 1, wherein the porous material has a weight per unit area WF of 20 $g/m^2$≤WF≤10,000 $g/m^2$.

11. The covering according to claim 1, wherein the third ply woven fabric is made of glass.

12. The covering according to claim 1, wherein the microperforated material has a thickness DM of 0.1 mm≤DM≤3 mm.

13. The covering according to claim 1, wherein the microperforated material has holes having a diameter Ø of 0.1 mm≤Ø≤2 mm.

14. The covering according to claim 1, wherein the microperforated material has 5 to 20 holes per $cm^2$.

15. The covering according to claim 1, wherein the microperforated material consists of or comprises corrosion-resistant steel.

16. The covering according to claim 1, wherein the fourth ply and the second ply are positioned on opposite sides of the first ply.

17. The covering according to claim 1, wherein the third ply is arranged between the first ply and the second ply.

18. The covering according to claim 1, wherein the third ply has a mesh size of 0.1 to 2 mm.

19. The covering according to claim 1, wherein the first ply and the second ply are spaced apart from the component with microcellular rubber spacers.

20. An electric motor or inverter of an electric motor, comprising a covering according to claim 1 that surrounds the electric motor or the inverter at least in some regions.

* * * * *